Feb. 2, 1971   W. W. HINTS   3,560,305
HEAT-SEALING MACHINE
Filed Nov. 21, 1967   4 Sheets-Sheet 4
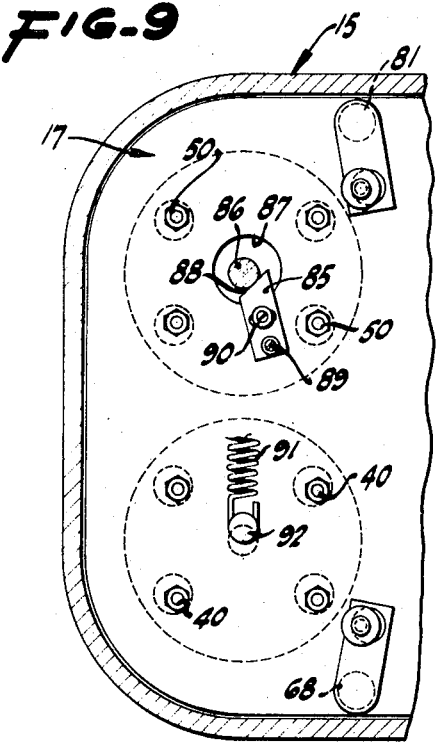
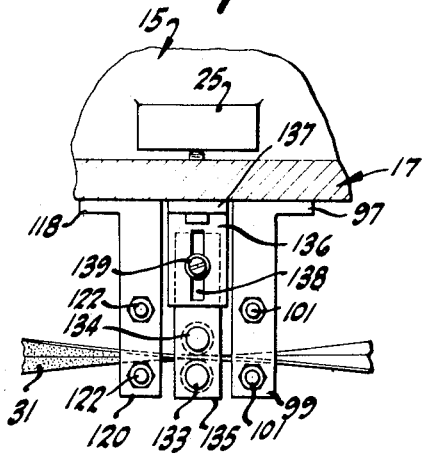
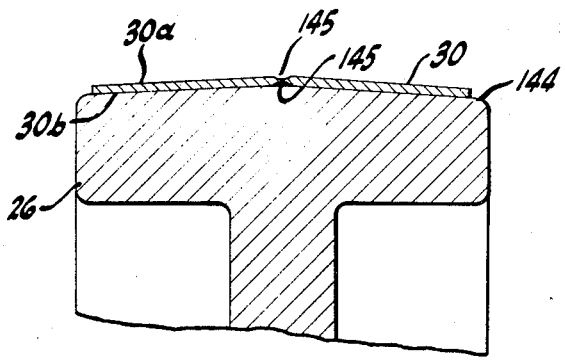
INVENTOR.
WILLIAM W. HINTS
BY
Stanley Bialos
ATTORNEY United States Patent Office 3,560,305
Patented Feb. 2, 1971

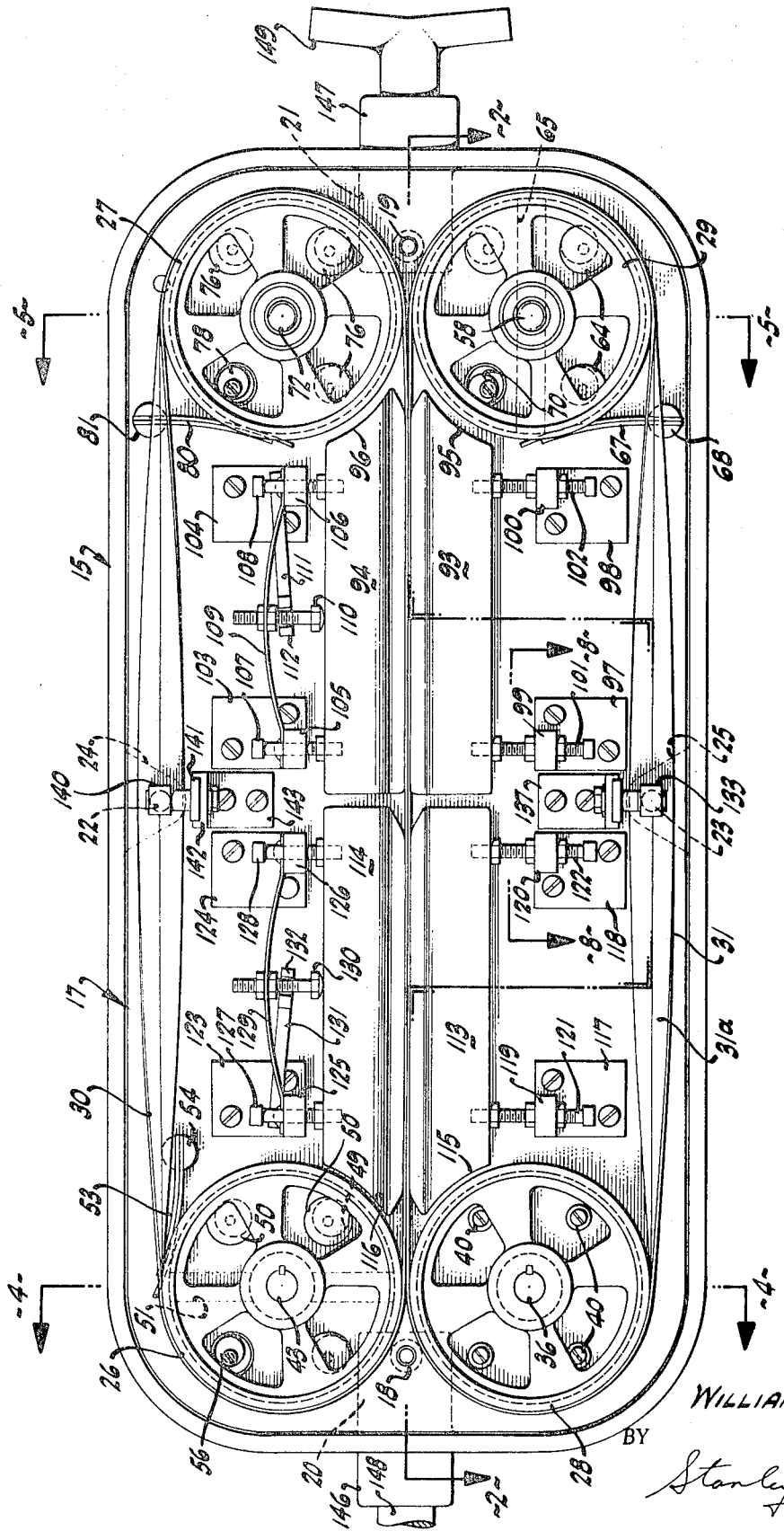

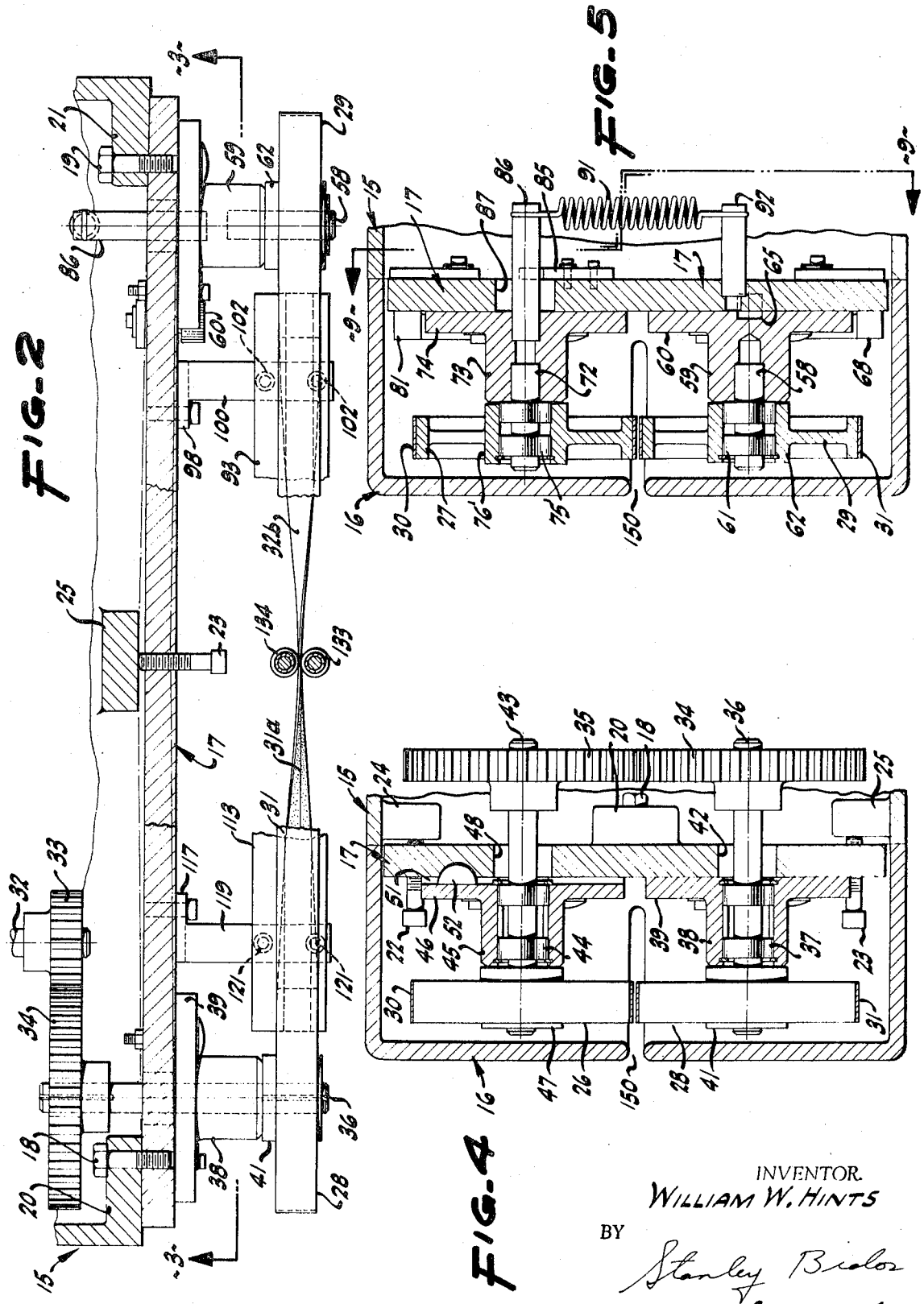

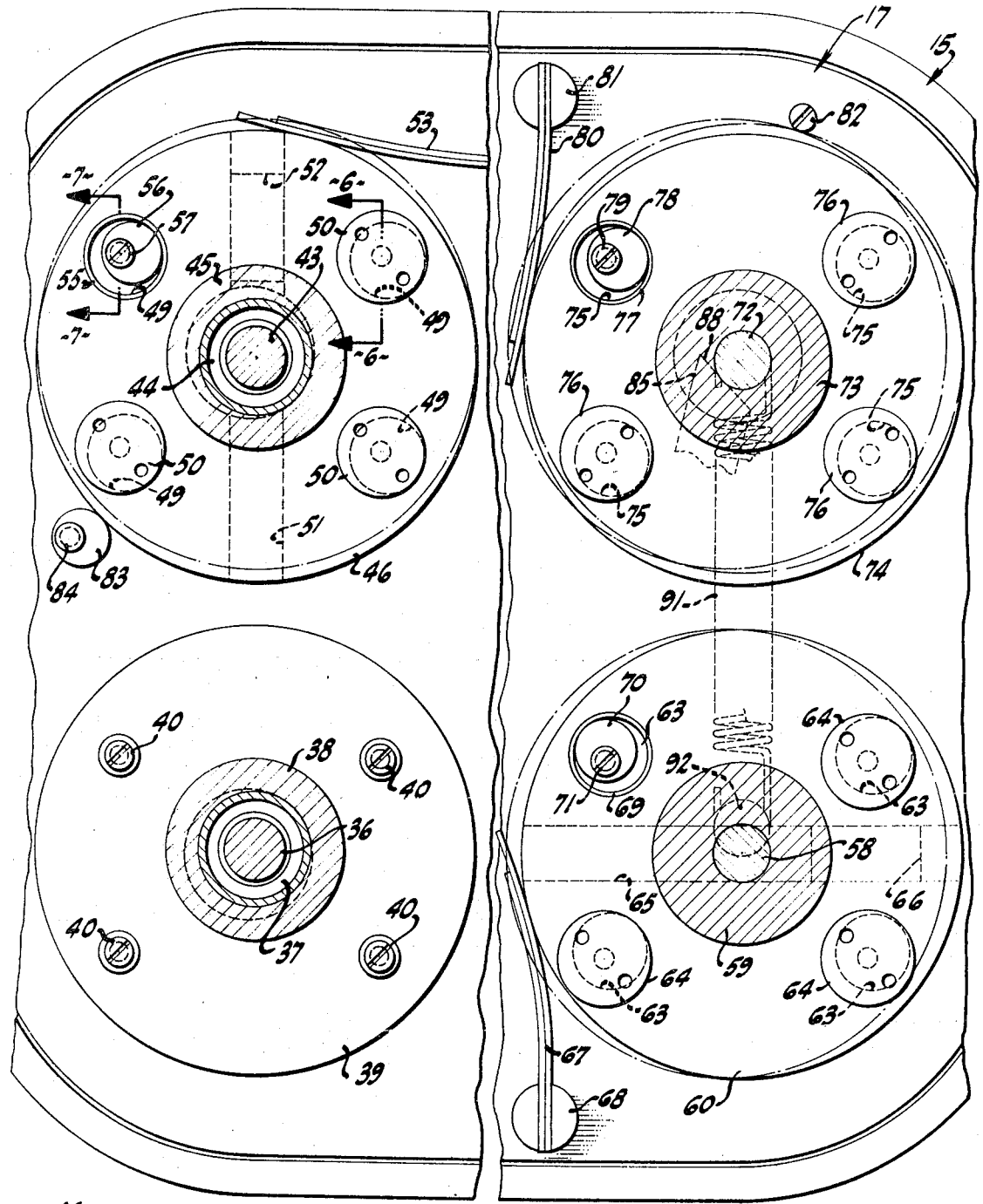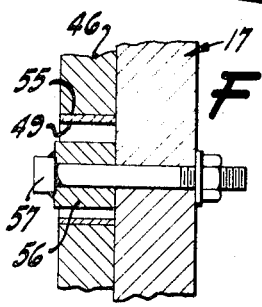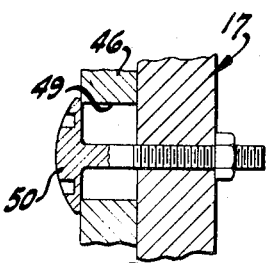

1

3,560,305
HEAT-SEALING MACHINE
William W. Hints, Novato, Calif., assignor of one-half to
Bette C. Hints, Novato, Calif.
Filed Nov. 21, 1967, Ser. No. 684,681
Int. Cl. B32b *31/20*
U.S. Cl. 156—498                           22 Claims

ABSTRACT OF THE DISCLOSURE

A heat-sealing machine for uniting heat-sealable materials such as polyethylene and other of the thermoplastic materials. The machine constitutes an improvement over those disclosed in Chaffee Pats. No. 2,542,900 and No. 2,542,901 which have a pair of endless belts respectively entrained about pulley wheels therefor which orient and drive the belts so that adjacent surfaces thereof travel in the same direction to grip therebetween and advance the material to be sealed through a sealing station. The improved machine includes twisted metal belts which have a self-cleaning action, and it further includes arrangements for making the belts track properly with the pulley wheels about which they are entrained.

---

This invention relates to an improved heat-sealing machine and, more particularly, to an improved machine of the type having a pair of endless belts respectively entrained about pulley wheels therefor which orient and drive the belts so that adjacent lengths thereof are disposed in close juxtaposition and travel in the same direction so as to grip heat-sealable materials therebetween and advance the same through a sealing station. The machine has utility in uniting or joining heat-sealable materials in a variety of configurations as, for example, flat sheetlike webs, and bags that are filled with produce, food stuffs and various other commodities.

Heat-sealing machines of the general type being considered are presently known and exemplary instances thereof are disclosed in U.S. Pats. No. 2,542,900 and No. 2,542,901. Such machines work quite satisfactorily and have met with considerable commercial acceptance; and in use thereof, the material to be sealed (the end of a bag, for example) is fed between substantially contiguous lengths or reaches of a pair of metal belts respectively entrained about pulley wheels which drive the belts in the same direction along their contiguous reaches. As the belts grip and advance the heat-sealable materials, they transmit heat thereto sufficient to effect a seal between juxtaposed layers of the materials. It has been found that with certain materials there is a tendency for particles thereof to adhere to and collect along the metal belts, and in an analogous sense there is also a tendency when the materials are provided with printing, designs and other descriptive matter thereon for the printing dies to adhere to the belts and either collect thereon or be redeposited on subsequent materials advanced by the belts through the machine.

Each of these occurrences is undesirable, and in view thereof, one of the objects of the present invention is to provide an improved heat-sealing machine having the general characteristics described but which includes an arrangement causing the belts to be automatically cleaned as they traverse their respective paths of travel so that any such deposits tending to collect thereon are removed from the contaminated surfaces of the belts before such surfaces are used in a subsequent sealing operation. Such self-cleaning action is effected without adding special cleaning structures and devices to the machine and instead, the endless metal belts are provided with a particular configuration which results in each belt being one-sided or having a single continuous surface in a functional sense (although the belts have two opposite sides at any transverse cross section thereof). and which continuous surface in one pass or revolution of the belt engages the material to be heat sealed thereby and in the next pass thereof faces away from the material so as not to contact the same and instead to engage a heating element which, therefore, serves not only to transmit heat through the belt to the material but also to scrape from the belt any deposits tending to collect thereon.

Another object of the invention is in the provision of an improved heat-sealing machine of the character described having means to enforce a predetermined positional relationship upon each of the belts that causes it to track properly with the pulley wheels therefor, and which tracking cannot practicably be provided by equipping the pulley wheels with flanges for holding the belts in position thereon. Proper tracking of the belts requires special provision therefor because at least one of the pulley wheels used with each belt is movable longitudinally as to enable the nonstretchable metal belts to be entrained about and removed from the pulley wheels; and at least one of the pulley wheels is movable in several directions so as to enable the machine to accept materials of various thickness. Accommodation of bodily displacements of at least certain of the pulley wheels precludes the use of rigid mounting means for enforcing conditions of accurate alignment on the pulley wheels which could result in proper tracking of the belts.

In one form of the machine the tracking means employed includes a warpable plate, and the pulley wheels are carried by such plate at spaced locations thereon. The plate is fixedly anchored at longitudinally spaced positions to support structure therefor in a manner such that the plate is bowed slightly in one predetermined direction. Adjustment structure cooperatively associated with the plate and its support structure enables the plate to be adjustably deflected in an opposite direction until each pair of pulley wheels for each of the belts is accurately aligned in a planar sense thereby causing the belts to track properly.

Additional objects and advantages will become apparent as the specification continues with a detailed description of the specific structural embodiment of the invention shown in the accompanying drawings in which:

FIG. 1 is a front view in elevation of a heat-sealing machine embodying the invention;

FIG. 2 is a horizontal longitudinal sectional view taken along the plane 2—2 of FIG. 1;

FIG. 3 is an enlarged broken vertical sectional view taken along the plane 3—3 of FIG. 2;

FIG. 4 is a transverse sectional view taken along the line 4—4 of FIG. 1;

FIG. 5 is a transverse sectional view taken along the line 5—5 of FIG. 1;

FIG. 6 is a broken transverse sectional view taken along the line 6—6 of FIG. 3;

FIG. 7 is a broken transverse sectional view taken along the line 7—7 of FIG. 3;

FIG. 8 is an enlarged horizontal sectional view taken along the line 8—8 of FIG. 1;

FIG. 9 is a broken vertical sectional view taken along the line 9—9 of FIG. 5; and FIG. 10 is a greatly enlarged broken transverse sectional view illustrating a portion of a pulley wheel with a belt entrained thereabout.

The heat-sealing machine includes a rear casing section generally denoted with the numeral 15, a front casing section 16 that extends forwardly from the rear casing section and is removably secured thereto, and a mounting plate 17 secured to the rear casing section 15 and extending therealong generally at the forward edge thereof, as shown best in FIGS. 4 and 5. The plate 17 is secured to the rear casing section 15 at longitudinally-spaced locations and, as shown most clearly in FIGS. 1 and 2, such securance of the plate 17 to the rear casing section is effected by means of cap screws 18 and 19 that are threadedly received by the plate and extend through inwardly projecting bosses or ears 20 and 21 provided by the rear casing section 15 along the opposite ends thereof.

It may be observed, as shown by broken lines in FIG. 2, that the ears 20 and 21 have a slight rearward and inward inclination such that the plate 17 curves or bends rearwardly slightly toward its center when the cap screws 18 and 19 are tightened to bring the facing surface portions of the plate and the ears 20 and 21 into tight abutment. This initial deformation of the plate is used in accurately aligning the pulleys for the endless metal belts, as will be described hereinafter, and in this reference the plate 17 along the top and bottom edges thereof at approximately its center line is equipped with adjustment screws 22 and 23 which are threadedly received in openings provided therefor in the plate and respectively bear against abutment ears or bosses 24 and 25 provided by the rear casing section. As the adjustment screws 22 and 23 are threaded inwardly into the openings therefor, they are brought into engagement with the respectively associated abutment bosses 24 and 25, and the resultant force development deflects the plate forwardly toward the position thereof illustrated by full lines in FIG. 2. Such tightening of the adjustment screws 22 and 23 brings the center portion of the plate 17 forwardly as a result of a combinative deflection of the plate, the ears 20 and 21, and wall portions of the casing section 15.

Mounted upon the plate 17 so as to rotate with respect thereto are a plurality of pulley wheels respectively denoted with the numerals 26, 27, 28 and 29. The pulley wheels are arranged in pairs respectively comprising the wheels 26 and 27 and the wheels 28 and 29, and each pair thereof is adapted to have an endless belt entrained thereabout. Accordingly, and as shown in FIG. 1, the wheels 26, 27 have an endless belt 30 entrained thereabout, and the wheels 28, 29 have an endless belt 31 associated therewith. The belts 30 and 31 are adapted to transmit heat to the materials to be sealed by the machine, and in the particular machine being considered are metal belts made of stainless steel. Evidently then, the belts are nonstretchable and since they are removably carried by the respectively associated pulley wheels, at least certain of these wheels should be movable in directions tending to reduce the normal longitudinal dimension therebetween to reduce tension on the belts and thereby enable the same to be removed from and mounted upon the pulley wheels.

The pulley wheels 26 and 28 are driven in enforced synchronism by an electric motor, not shown, which motor is equipped with a shaft 32 (FIG. 2) having a spur gear 33 mounted thereon. The gear 33 drivingly engages a gear 34 associated with the pulley wheel 28, and the gear 34 meshingly engages a gear 35 associated with the pulley wheel 26. Thus, one pulley wheel in each pair thereof is positively driven, and because they are driven in positive synchronism, the belts 30 and 31 are driven at precisely the same speeds.

Referring to FIG. 4 in particular, it is seen that the drive gear 34 is mounted upon a shaft 36 so as to rotate therewith, and the shaft is journalled for rotation on a bearing assembly 37 held within the collar 38 of a support disc 39 tightly secured to the plate 17 by a plurality of screws 40 which, as shown in FIG. 1, total four in number and are angularly spaced apart along the disc 39. The shaft 36 extends forwardly from the collar 38 and has the hub 41 of the pulley wheel 28 fixed thereon. The shaft 36 also extends rearwardly through an opening 42 in the plate 17. Thus, the pulley wheel 28, shaft 36 and drive gear 34 are supported for rotation relative to the plate 17 and disc 39, and the shaft 36 is constrained against forward and rearward displacements along the axis thereof by the bearing assembly 37 which is pressed onto or otherwise secured to the shaft so that relative axial movement therebetween is prevented, and which bearing assembly is locked within the collar 38 by snap rings adjacent each end thereof, as seen in FIG. 4.

The pulley wheel 26 is rotatably supported in substantially the same manner as the pulley wheel 28 and, therefore, the drive gear 35 is mounted upon a shaft 43 equipped with a bearing assembly 44 held within the collar 45 of a disc 46, and the pulley wheel 29 is equipped with a hub 47 that is keyed to the shaft 43 so as to rotate therewith. The shaft 43 extends through an opening 48 in the plate 17, and the opening 48 is substantially greater in diameter than the diameter of the shaft 43 so as to enable the shaft to be bodily movable relative to the plate. In this respect, the disc 46 is supported by the plate 17 in a manner permitting the disc to be displaced bodily with respect thereto, and in order to provide such support for the disc, it has four angularly-spaced openings 49 therein, and respectively extending through three of these openings are the shanks or bolts 50.

As shown most clearly in FIG. 6, each of the three bolt-equipped openings 49 is much larger in diameter than the diameter of the shank of the blot 50 extending therethrough, wherefore the disc 46 is bodily displaceable relative to such bolts which are screwed into and extend through the plate 17 so as to be confined thereby against translational displacement. The bolts 50 are equipped on the rear side of the plate 17 with lock nuts constraining the bolts in their positions of adjustment in which a predetermined clearance is provided between the plate and heads of the belts enabling the disc to be bodily displaced along the plate between the full line and broken line positions illustrated in FIG. 3.

Although the disc 46 would be permitted to move in all directions relative to the plate 17 within the limits defined by the openings 49 and bolts 50 and by the shaft 43 and plate opening 48, movement of the disc is confined to linear displacements along a generally vertical axis by a slot and key arrangement comprising a slot 51 formed in the disc and a key 52 carried by the plate 17 which is slidably seated within the slot. As shown best in FIGS. 1 and 3, the slot 51 is vertically disposed so that the disc 46 and pulley wheel 26 associated therewith are displaceable in vertical directions only toward and away from the lower pulley wheel 28. The disc 46 and pulley wheel 26 associated therewith are biased downwardly by a leaf spring 53 which at its outer free end bears downwardly upon the disc 46 and at its opposite end is confined within a spring holder 54 that extends through the plate 17 in threaded engagement therewith and is fixed in any position of angular adjustment, which adjustment alters the biasing force imparted to the disc by the spring, by a lock nut.

As shown best in FIGS. 3 and 7, the remaining opening 49 in the disc 46 has a brass insert ring 55 positioned therein, and adapted to frictionally engage such ring is a generally cylindrical cam or eccentric 56 having a screw 57 welded or otherwise secured thereto which extends through the plate 17. The axis defined by the screw 57 is offset from the center of the cam 56 and, evidently, angular displacements of the screw bring the eccentric 56 into engagement with the ring 55 at predetermined locations therealong. The relative disposition of the eccentric 56, screw 57 and ring-equipped opening 49 is such that angular displacement of the eccentric in a counterclockwise direction, as viewed in FIG. 3, moves the disc 46 upwardly against the biasing force of the spring 53, thereby increasing the spacing between the pulley wheels 26 and 28 and, therefore, between the belts 30 and 31 in the vicinity of such pulley wheels.

The pulley wheels 27 and 29 are idler pulleys, and except for the omission of the gear drive required for the pulley wheel 28, the support and mounting arrangements for the wheels 27 and 29 are generally similar to that of the drive pulley 28. Thus, the pulley wheel 29 is mounted upon a stub shaft 58 which may be pressed into an opening therefor in a collar 59 provided by a disc 60, or is otherwise secured to the disc as by being cast integrally therewith. The shaft 58 is equipped with a bearing assembly 61 received within an opening therefor in the hub 62 of the pulley wheel 29. The bearing assembly is pressed onto or otherwise locked upon the shaft 58 and may be confined within the hub 62 by a snap ring, as shown. The disc 60 is provided with four angularly spaced openings 63 therethrough, three of which respectively receive therein the shanks of bolts 64. As in the case of the aforementioned disc 46, the disc 60 is permitted by the openings 63 and bolts 64 to move in substantially all directions relative to the plate 17 because of the dimensional relationship of the openings and bolts, but movements of the disc are confined to linear displacements along a horizontally disposed axis because of the cooperative engagement provided by a horizontally oriented slot 65 formed in the disc 60 and a key 66 carried by the plate 17 which is slidably received within the slot.

The disc 60 and pulley wheel 29 carried thereby are resiliently biased outwardly (toward the right as viewed in FIG. 1) by a leaf spring 67 so as to increase the spacing between the pulley wheels 28 and 29 and thereby tension the belt 31. The leaf spring 67 bears at its free end against the disc 60 and at its other end is confined by an adjustable spring holder 68, as heretofore described with reference to the spring holder 54. The other of the openings 63 is equipped with a brass insert ring 69, and an eccentric or cam 70 secured to and supported by a screw 71 is adapted to engage the ring 69. Whenever the screw 71 and cam 70 are displaced in a counterclockwise direction, as viewed in FIG. 3, the cam is operative to displace the disc 60 and its pulley wheel 29 inwardly against the biasing force of the spring 67 so as to release tension in the belt 31 and thereby enable such belt to be mounted upon or removed from the pair of pulley wheels 28, 29.

Analogously, the pulley wheel 27 is mounted upon a stub shaft 72 pressed into an opening therefor in a collar 73 provided by a disc 74. The shaft 72 is equipped with a bearing assembly 75' received within an opening therefor in the hub 76' of the pulley wheel 27. The bearing assembly is pressed onto or otherwise locked upon the shaft 72 and may be confined within the hub 76' by a snap ring, as shown. The disc 74 is provided with four angularly-spaced openings 75 there through, three of which respectively receive therein the shanks of bolts 76. As in the case of the prior-described discs 46 and 60, the disc 74 is permitted by the openings 75 and bolts 76 to move in substantially all directions relative to the plate 17 because of the dimensional relationship of the openings and bolts.

The other of the openings 75 is equipped with a brass insert ring 77, and an eccentric or cam 78 secured to and supported by a screw 79 is adapted to engage the ring 77. Whenever the screw 79 and cam 78 are displaced in a counterclockwise direction, as viewed in FIG. 3, the cam is operative to displace the disc 74 and its pulley wheel 27 generally inwardly and upwardly against the force of a leaf spring 80 which at one end bears against the disc 74 and at its other end is fastened to an adjustable spring holder 81. A stop 82 in the form of a screw carried by the plate 17 engages the outer cylindrical surface of the disc 74 and limits upward movement thereof under the influence of the eccentric or cam 78, wherefore the disc moves upwardly and inwardly toward the position thereof indicated by broken lines in FIG. 3 when the cam 78 is angularly displaced in a counterclockwise direction, as viewed in such figure. Inward movement of the disc as imparted thereto by the cam 78 is sufficient to release tension in the belt 30 and thereby enable such belt to be mounted upon or removed from the pair of pulley wheels 26, 27.

The generally upward movement of the disc 74 permitted by the spring 80 and stop 82 enables the apparatus to accommodate passage between the pulley wheels 27 and 29 of material or objects which are relatively thick and might otherwise cause damage to the apparatus or be prevented from being advanced therethrough. Material thicknesses and objects of such character are also accommodate by the apparatus adjacent the discharge end thereof by the permissible upward displacements of the disc 46 and pulley wheel 26 which are accommodated by the spring 53 and slot and key arrangement 51, 52, as previously explained. In this reference, it may be noted that the maximum extent of the downward movement of the pulley wheel 26 toward the pulley wheel 28 is adjustably determined by a stop 83 in the form of an eccentric carried by a screw pin 84. Such stop 83 is adapted to engage the disc 46 along a lower surface portion thereof to limit its maximum downward displacement. It will be appreciated in this connection that the cam 56 when released from the ring 55 is turned to a position in which it cannot be engaged by the ring 55 so that the disc 46 can be displaced in vertical directions without constraint therefrom.

A stop 85 is associated with the pulley wheel 27 and disc 74 therefor, and such stop is secured to the plate 17 along the rear wall thereof and is adapted to engage a shaft 86 pressed into an opening in, or otherwise secured to, the collar 73, and which shaft extends through a large opening 87 in the plate 17 so as to be displaceable with the disc 74 relative to the plate. The stop 85 has an inclined upper surface 88 adapted to be engaged by the shaft 86 and limits downward movement thereof and of the disc 74 and pulley wheel 27 associated therewith. The stop 85 has an elongated opening therethrough, and adjustment of the stop is effected by displacing the same about an axis defined by a mounting screw 89 within the limits established by such opening and by a lock screw 90 extending therethrough. The resilient biasing force imparted to the disc 74 by the leaf spring 80 is augmented by a helical spring 91 that at one end is anchored to the shaft 86 and at its other end is secured to a pin 92 carried by the plate 17 along the rear wall thereof.

The heat sealing apparatus is provided along the adjacent reaches or lengths of the belts 30 and 31 with heating means which transmits through such belts heat sufficient to effect sealing or joinder of the heat-sealable materials being advanced through the apparatus between such adjacent reaches of the belts. In the particular embodiment of the apparatus illustrated, the heating elements are encased within lower and upper shoes or casings 93 and 94 which are elongated and extend longitudinally in facing juxtaposition with each other and with the adjacent reaches of the belts passing therebetween. Although generally wider than the belts, the shoes along the surfaces thereof in contact with the belts are as wide as or slightly narrower than the belts, and at their outer ends the shoes are curved, as shown at 95 and 96, so that they can be brought into close proximity with the respectively associated pulley wheels 29 and 27. The shoes 93 and 94 are made of a suitable heat-conductive material, such as brass, and they have insulation-encased resistance-heating elements positioned therewithin. Since heating arrangements of this type are well known, no illusration of the heating elements is included.

The lower shoe 93 is fixedly located with respect to the plate 17 by mounting means that includes a pair of brackets 97 and 98 secured to the plate 17 by cap screws, and which brackets are respectively provided with outwardly projecting support arms 99 and 100 through which extend a plurality of mounting screws 101 and 102 that are received within threaded openings therefor within the shoe 93 and are fixed in position with respect to such shoe by lock nuts, as illustrated. The mounting screws 101 and 102 are movable through openings provided therefor in the support arms 99 and 100 and are fixedly located in any position of adjustment by lock nuts threadedly received upon the screws and which bear against opposite sides of the associated support arm. Thus, the vertical location of the shoe 93 can be established by appropriate adjustment of the screws 101 and 102 relative to their associated support arms, and the screws can be adjusted individually to level the shoe or assure its being properly disposed relative to the belt 31.

The upper shoe 94 is also supported by the plate 17 through brackets 103 and 104 secured to the plate by cap screws, and which brackets are respectively provided with outwardly projecting support arms 105 and 106. Each of the support arms is provided with a plurality of openings therethrough, and freely movable in vertical directions through such openings are a plurality of mounting screws 107 and 108 threadedly received within openings provided therefor in the shoe 94. Thus, as concerns the shoe 94 and mounting screws 107 and 108, the shoe is freely movable in vertical directions and it is resiliently biased downwardly toward engagement with the underlying reach or length of the belt 30 by a leaf spring 109 extending between the support arms 105 and 106 and fixedly secured thereto at its ends by cap screws.

Centrally the leaf spring 109 has affixed thereto in depending relation a pusher or force-transmitting element 110 that bears downwardly against the shoe 94 along a central portion thereof, although it may be screwed into or otherwise secured to the shoe. The spring 109 is normally stressed as shown in FIG. 1 so that it imparts a downwardly directed biasing force to the shoe 94 through the pusher 110. An arm 111 having a bifurcated end 112 adapted to be positioned about the pusher 110 beneath the spring 109 is connected with the support 106 through a cap screw, and when the cap screw is tightened, the arm 111 is swung upwardly in a clockwise direction, as viewed in FIG. 1, to displace spring 109 and pusher 110 upwardly so as to relieve the shoe 94 from such spring force and thereby facilitate changing of the belts 30 and 31. In the case in which the pusher 110 is secured to the shoe 94, upward movement of the pusher would carry the shoe with it and thereby relieve the frictional contact of the shoe with the belt.

The heat-sealing apparatus is provided along the adjacent reaches of the belts 30 and 31 with cooling means which extract through such belts heat from the materials sealed or joined in passing through the sealing station defined by the shoes 93 and 94. In the particular embodiment of the apparatus illustrated, the cooling elements are encased within lower and upper shoes or casings 113 and 114 which are elongated and extend longitudinally in facing juxtaposition with each other and with the adjacent reaches of the belts passing therebetween. Although generally wider than the belts, the shoes along the surfaces thereof in contact with the belts are as wide as or slightly narrower than the belts, and at their outer ends the shoes are curved, as shown at 115 and 116, so that they can be brought into close proximity with the respectively associated pulley wheels 28 and 26. The shoes 113 and 114 are made of a suitable heat-conductive material such as brass, and they have passages therein through which water or other cooling liquid flows. Such passages are not illustrated since cooling techniques of this type are well known.

The lower shoe 113 is fixedly located with respect to the plate 17 by mounting means that includes a pair of brackets 117 and 118 secured to the plate 17 by cap screws, and which brackets are respectively provided with outwardly projecting support arms 119 and 120 through which extend a plurality of mounting screws 121 and 122 that are received within threaded openings therefor within the shoe 113 and are fixed in position with respect to such shoe by lock nuts, as illustrated. The mounting screws 121 and 122 are movable through openings provided therefor in the support arms 119 and 120 and are fixedly located in any position of adjustment by lock nuts threadedly received upon the screws and which bear against opposite sides of the associated support arm. Thus, the vertical location of the shoe 113 can be established by appropriate adjustment of the screws 121 and 122, as described hereinbefore in connection with the shoe 93.

The upper shoe 114 is also supported by the plate 17 through brackets 123 and 124 secured to the plate by cap screws, and which brackets are respectively provided with outwardly projecting support arms 125 and 126. Each of the support arms is provided with a plurality of openings therethrough, and freely movable in vertical directions through such openings are a plurality of mounting screws 127 and 128 that are threadedly received with openings provided therefor in the shoe 114. Thus, as concerns the shoe 114 and mounting screws 127 and 128, the shoe is freely movable in vertical directions and it is resiliently biased downwardly toward engagement with the underlying reach or length of the belt 30 by a leaf spring 129 extending between the support arms 125 and 126 and fixedly secured thereto at its ends by cap screws.

Centrally the leaf spring 129 has affixed thereto in depending relation a pusher or force-transmitting element 130 that bears downwardly against the shoe 114 along a central portion thereof, although it may be secured to the shoes as explained with respect to the element 110. The spring 129 is normally stressed as shown in FIG. 1 so that it imparts a downwardly directed biasing force to the shoe 114 through the pusher 130. An arm 131 having a bifurcated end 132 adapted to be positioned about the pusher 130 beneath the spring 129 is connected with the support 125 through a cap screw, and when the cap screw is tightened, the arm 131 is swung upwardly in a counterclockwise direction, as viewed in FIG. 1, to displace spring 129 and pusher 130 upwardly so as to relieve the shoe 114 from such spring force and thereby facilitate changing of the belts 30 and 31.

As illustrated in FIGS. 1 and 2, each of the belts 30 and 31 is a twisted belt formed by taking a flat, two-sided strip of material, constraining one end of the strip while rotating the other end with respect thereto about the longitudinal axis of the strip through 180°, and then joining the ends of such strip to each other to form a closed loop with a preformed permanent 180° twist. A twisted belt of this type while having two distinct sides prior to the ends of the strip being secured to each other displays the phenomenon of having in a functional sense but a single side after joinder of such ends, although at any transverse cross section through the belt it is two sided. Accordingly, when the belt is entrained about a pair of pulley wheels and is driven thereby, in one complete rotation of the belt a point drawn on the surface thereof will face toward an element disposed along the path of travel of the belt, and on the next complete rotation thereof, such point will face away from the element.

Further, and referring to FIG. 2 and considering the belt 31, it travels from left to right in the direction of the arrow along its lower reach, and the surface portion of the belt which is facing upwardly as it leaves the pulley wheel 28 rotates through an angular displacement of 180° and faces downwardly as it moves into engagement with the pulley wheel 29. The inversion of the belt is indicated in FIG. 2 by the stipple-type shading along the surface portion 31a which is facing upwardly as it leaves the pulley wheel 28, and by the omission of shading from the surface portion 32b which faces upwardly as it approaches the pulley wheel 29. Such inversion or rotation of the belts 30 and 31 occurs along the upper reach of the belt 30 and lower reach of the belt 31 so that the adjacent reaches thereof passing between the heating shoes 93 and 94 and cooling shoes 113 and 114 are disposed in substantially contiguous parallelism.

The heat-sealing apparatus includes means causing the belts to track or remain in proper alignment with respect to the associated pulley wheels, and in the particular embodiment of the apparatus being considered, a plurality of different tracking means are embodied therein. One such means is a pulley-alignment means and constitutes the prior-described adjustable warpage of the plate 17 which enables the paired pulley wheels for each belt to be accurately aligned in a common plane. For example, if the planes defined by the pulley wheels 26 and 27 are not coincident, the upper adjusting screw 22 is turned in the appropriate direction so as to cause the upper center portion of the plate 17 to move or warp either inwardly or outwardly, as the case may be, which movement thereof results in the relative positions of the planes defined by the upper pulley wheels being angularly displaced relative to each other. Proper relative displacement of such planes by manipulation of the upper adjusting screw 22 will bring the planes into proper coincidence. Similar adjustment of the lower screw 23 is used to effect alignment of the planes defined by the lower pulley wheels 28 and 29. It may be noted that although adjustment of one of the screws 22 and 23 tends to influence somewhat the disposition of the planes of the remote or nonassociated pulley wheels, the influence is of a minor character, usually compensated by slight readjustment of the other screw, and therefore not objectionable.

Another tracking means embodied in the present apparatus is a belt-guide means in the form of rollers that engage the belts 30 and 31 along the outer reaches thereof. Considering the belt 31 in particular, the tracking means being considered includes a pair of rollers 133 and 134 supported for rotation by a plate 135 secured to the horizontally-disposed support arm 136 of a L-shaped bracket having a vertically disposed arm 137 fixed to the plate 17 by a plurality of cap screws. The arm 136 has an elongated slot 138 formed therealong which passes a screw 139 therethrough threaded into the plate 135. Evidently then, the plate 135 can be adjustably positioned inwardly and outwardly with respect to the plate 17 within the limits defined by the slot 138 and screw 139. Such adjustment of the plate 135 determines the location of the rollers 133 and 134 which are disposed in vertical juxtaposition and pass the belt 31 therebetween at the location at which it has rotated to a 90° position (i.e., vertical) in effecting inversion of the surface thereof in passing from the pulley wheel 28 to the pulley wheel 29. In adjustment of this belt-guide means, if the belt 31 tends to untrack from the pulley wheels 28 and 29 by moving outwardly thereon in a direction away from the plate 17, the mounting plate 135 is adjusted inwardly to a position in which the outer roller 133 imparts sufficient force to the belt 31 that it remains in tracking alignment with the pulley wheels 28 and 29. The plate 135 is adjusted in the opposite direction whenever the belt 31 tends to untrack by moving inwardly toward the plate 17.

A similar arrangement is provided for the upper belt 30, as shown in FIG. 1, and in that figure the outer roller is designated with the numeral 140, the mounting plate is designated 141, and the horizontal and vertical arms or brackets are respectively designated 142 and 143. The mounting plate 141 is adjusted in the appropriate direction to correct any tendency of the belt 30 to untrack, as described heretofore with respect to the mounting plate 135 and belt 31.

Still another form of tracking means is illustrated in FIG. 10 and it includes the provision of a crown along the outer belt-engaging surface of each of the pulley wheels. Thus, in FIG. 10 the pulley wheel illustrated may be taken for positive identification to be the wheel 26, and the outer belt-engaging surface thereof is designated with the numeral 144. The surface 144 has a rise toward the center thereof and such rise may be fairly slight, and in one typical embodiment of the apparatus is a few thousands of an inch along the radius of the wheel. The belt 30 riding along such surface 144 is seen to conform to the curvature or crown thereof, and such conformation of the belt to the surface of the pulley wheel is effected by providing a slight axially-extending groove 145 or line of relative weakness in the belt.

The groove is so formed that at any transverse section taken through the belt, as shown in FIG. 10, the groove appears on the opposite surface portions 30a and 30b thereof; and it constitutes a very slight weakening of the belt and may be formed therein by passing the belt in contact with an abrasive wheel or disc. In certain instances the belt may be provided with a plurality of grooves 145, which plurality thereof changes the appearance of the heat seal effected by cooperative engagement of the belts 30 and 31 with heat-sealable materials passing therebetween. However, as respects tracking of the belts, a single, centrally located groove as shown is adequate.

In practice, any one of the various tracking means described may be adequate to maintain the belts in proper alignment on the respectively associated pulley wheels and, therefore, a combination of any two of the described tracking means might be employed. Thus, in certain cases the pulley wheels may each have a flat outer surface rather than being crowned, and in such event, the belts used therewith may not have one or more grooves 145 therein. Also, depending upon the thickness and stiffness of a belt, it may not be necessary to use a groove 145 to cause tracking of a belt along the curved or crowned surface of a pulley wheel.

The heat-sealing machine may be supported for use by any convenient means, and the particular machine shown, as illustrated in FIG. 1, is equipped with tubular bosses 146 and 147 extending outwardly from the rear casing section 15 at opposite ends thereof, and such bosses are internally threaded so as to respectively receive therein wing-shaped clamp nuts 148 and 149. The bosses and respectively associated nuts are used to secure the rear casing section 15 in any position of angular adjustment relative to a pair of support arms provided by a hand, floor or table support for the machine. Also, as shown in FIG. 4, the front casing section 16 has a longitudinally extending slot 150 formed in the front and end walls thereof in alignment with the contiguous reaches of the belts 30 and 31 so that material to be sealed can be passed through the machine with the front cover thereof in position.

In use of the machine, materials to be united by the transmission of heat thereto through the endless belts or bands 30 and 31 are inserted therebetween adjacent the pulley wheels 27 and 29 by moving such materials through the opening 150 in the casing section 16. As explained heretofore, the pulley wheel 27 is displaceable upwardly against the biasing force of the springs 80 and 91 so as to accommodate materials of excessive thickness, and the upper heating shoe 94 and upper cooling shoe 114 are similarly displaceable upwardly against the biasing force of the leaf springs 109 and 129 respectively associated therewith to accommodate various material thicknesses. The driven pulley wheel 26 is also displaceable upwardly against the biasing force of the spring 53, wherefore all of the various components of the machine are able to accommodate materials of various and of excessive thicknesses.

As respects the function of the machine, heat-sealable materials of various types can be used therewith; and with certain materials it may be desirable to change the spacing between adjacent pulley wheels and between the bands 30 and 31 in the vicinity thereof. Accordingly, when such materials are to be fed through the machine, the stop 85 (FIG. 9) may be adjusted so as to define the most desirable lowermost position of the pulley wheel 27 and thereby establish the requisite spacing between the pulley wheels 27 and 29 at the infeed end of the machine; and the stop 83 may be similarly adjusted to establish the position of the pulley wheel 26.

The endless bands 30 and 31 are disposed in substantially contiguous juxtaposition along the sections thereof constituting the lower reach of the band 30 and upper reach of the band 31 so as to grip the heat-sealable materials therebetween and advance the same through the machine. Thus, the bands impart compressive force to the materials during the transmission of heat thereto at the heat-sealing station, thereby facilitating the heat-sealing operation by means of which the materials are united. In the usual use of the machine, the heat-transmitting shoe 94 resiliently urges the juxtaposed sections of the bands 30 and 31 downwardly, wherefore the compressive force otherwise imparted by the bands to materials gripped therebetween is augmented by the pressure exerted by the shoe 94. The two shoes 93 and 94 also constitute friction structures that engage the respectively associated bands and thereby tend to remove deposits therefrom which may collect thereon as a consequence of their being in engagement with the materials advanced thereby through the machine. The shoes 113 and 114 forming the cooling station of the machine also constitute friction structure tending to remove deposits from the bands. In this same reference, the guide means formed by the rollers 133 and 134 in the case of the band 31, and by corresponding rollers in the case of the band 30, could be comprised of nonrotatable friction structures engageable with the bands to remove deposits therefrom.

It has been found that the twisted bands 30 and 31 track along the respectiveely associated pulley wheels much more readily than ordinary flat bands, and this is the case irrespective of whether the twisted bands are or are not provided with a central groove or recess 145 therealong. As stated hereinbefore, the groove 145 facilitates conformation of the band to the arcuate configuration of a crowned pulley wheel, and it also enables the band to be twisted more readily. The various tracking means specifically considered are exemplary and others could be employed; and further considering the tracking means formed by the guide-structure rollers 133 and 134 associated with the bands 31, such rollers engage the band at the location of the inversion thereof defining the transition between the pulley wheel engaging and nonengaging surface portions of the band. The center of such transition of the band is substantially normal to the general plane of the juxtaposed sections of the two bands, and as is clearly evident in FIG. 2 with the band 31, each band is provided with a preformed permanent 180° inversion-enforcing twist causing any surface area or particular point along the surface of a band to be oriented so as to engage heat-sealable materials only on alternate revolutions of the band.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a heat-sealing machine having a station at which heat sufficient to unite heat-sealable materials is transmitted thereto, a pair of spaced-apart pulley wheels having an endless band entrained thereabout for movement along a predetermined path through said station and in engagement with such materials in moving through a portion of such path, drive means for energizing the movement of said band along such path, and friction structure engageable with said band for removing deposits therefrom which may collect thereon as a consequence of such engagement thereof with such materials, said band having a preformed permanent 180° inversion-enforcing twist therealong causing it to provide functionally a single continuous surface cooperatively engageable with said friction structure so that any point along the surface of said band will engage said friction structure between the alternate revolutions of the band during which such point is oriented for engagement with such materials.

2. The heat-sealing machine of claim 1 and further comprising tracking means for confining said band on said pulley wheels.

3. The heat-sealing machine of claim 1 in which said friction structure is located at said station and comprises a component of the heat-sealing means thereat.

4. In a heat-sealing machine having a station at which heat sufficient to unite heat-sealable materials is transmitted thereto, two pairs of spaced-apart pulley wheels having endless bands respectively entrained thereabout for movement along predetermined paths in which sections of said bands are oriented in substantially parallel juxtaposition for gripping materials therebetween to carry the same through said station, drive means for energizing the movement of said bands along such paths, and friction structure engageable with each of said bands for removing deposits therefrom which may collect thereon as a consequence of advancing such materials through said station, each of said bands having a preformed permanent 180° inversion-enforcing twist therealong causing it to provide functionally a single continuous surface cooperatively engageable with said friction structure so that any point along the surface of said band will engage said friction structure between the alternate revolutions of the band during which such point is oriented for engagement with such materials in carrying the same through said station.

5. The heat-sealing machine of claim 4 in which said friction structure comprises a pair of separate friction elements respectively arranged with said bands and disposed along the associated paths of travel thereof.

6. The heat-sealing machine of claim 5 in which each of said friction elements is located at said station and comprises a component of the heat-transmitting means thereat.

7. The heat-sealing machine of claim 6 in which each of said friction elements is a shoe extending along the path of travel of the associated band at said station and from which heat is transmitted to such materials through said bands.

8. The heat-sealing machine of claim 4 and further comprising tracking means for confining each of said bands on the associated pair of pulley wheels.

9. The heat-sealing machine of claim 8 in which each of said pulley wheels is a crowned pulley having a slight curvature along the band-engaging periphery thereof and comprising the aforesaid tracking means.

10. The heat-sealing machine of claim 9 in which each of said bands has a groove extending longitudinally along the surface thereof to facilitate conformation of said bands to the crowned configuration of said pulley wheels.

11. The heat-sealing machine of claim 8 and further comprising guide structures respectively engaging said bands at the location of the inversion thereof defining the transition between the pulley wheel engaging and nonengaging surface portions thereof.

12. The heat-sealing machine of claim 11 in which each of said bands at such location of transition thereof is substantially normal to the general plane of the aforesaid substantially parallel band sections, each of said guide structures comprising a pair of rollers rotatably engaging the associated band at such location of transition thereof.

13. The heat-sealing machine of claim 12 and further comprising adjustable support structure for the rollers of each guide structure so that the direction and magnitude of the lateral force imparted to each of said bands by the associated rollers is adjustable as required to maintain each band in tracking relation with the associated pulley wheels.

14. The heat-sealing machine of claim 8 in which said tracking means includes a warpable plate rotatably supporting said pulley wheels, means for supporting said plate at longitudinally spaced-apart locations generally adjacent said pulley wheels, and adjustment means interposed between said pulley wheels and together with said support means determining the warpage of said plate so as to effect a condition of alignment between the pulley wheels of each pair thereof.

15. The heat-sealing machine of claim 14 in which said means for supporting said plate includes an angularly disposed boss at each such longitudinally-spaced location and fastener structure for securing the plate to each boss whereby the warpage of said plate is the curvature enforced thereon between said bosses, and in which said adjustment means interposed between said pulley wheels includes means for altering the curvature of said plate toward a planar disposition thereof.

16. The heat-sealing machine of claim 15 in which said adjustment means includes a pair of transversely-spaced adjustment structures respectively associated with said bands and the pulley wheels therefor so that the alignment of each pair of pulley wheels is separately determinable.

17. The heat-staling machine of claim 8 in which said friction structure comprises a pair of separate friction elements respectively arranged with said bands and disposed at said station and comprising a component of the heat-transmitting means thereat.

18. In a heat sealing machine having a station at which heat sufficient to unite heat-sealable materials is transmitted thereto, two pairs of spaced apart pulley wheels having endless bands respectively entrained thereabout for movement along predetermined paths in which adjacent inner reaches of said bands are in parallel juxtaposition for gripping and carrying said material therebetween, a pair of opposite heat transmitting shoes at said stations in respective association with the juxtaposed reaches of said bands for transmitting heat therethrough to such materials, friction structure following said station engageable with each of the juxtapositioned parallel reaches of said bands which removes deposits from said bands which may collect thereon at such heat sealing station, drive means for effecting movement of said bands along said paths, each of said bands having a preformed permanent 180° twist therein wherein one end of a flat sided strip of material is twisted 180° and joined in such twisted position to the opposite end so that any given point on either surface of the band will engage a heat sealing shoe and said friction structure in alternate revolutions of the band.

19. The heat-sealing machine of claim 18 wherein said friction structure includes a second pair of longitudinally extending cooling shoes respectively associated with said bands for cooling such materials being carried from said station by said bands.

20. The heat-sealing machine of claim 19 in which each shoe of one of said pairs thereof is in substantial engagement with the band associated therewith.

21. The heat-sealing machine of claim 20 in which all of said shoes are in substantial engagement with the respectively associated bands.

22. The heat sealing machine of claim 18 wherein a pair of tracking rollers is provided which engage the opposite surfaces of the outer reach of each band at the preformed twisted portion thereof.

References Cited
UNITED STATES PATENTS

| | | | |
|---|---|---|---|
| 779,980 | 1/1905 | Whitaker | 198—165 |
| 873,633 | 12/1907 | Thomas | 198—165 |
| 1,908,368 | 5/1933 | Krieger | 198—165 |
| 2,145,786 | 1/1939 | Birkmeyer | 198—165 |
| 2,542,901 | 2/1951 | Chaffee | 156—498 |

BENJAMIN A. BORCHELT, Primary Examiner

R. E. HART, Assistant Examiner

U.S. Cl. X.R.

74—231